J. B. SCHUMAN.
SHOCK LOADER.
APPLICATION FILED APR. 20, 1905.
948,380.
Patented Feb. 8, 1910.
2 SHEETS—SHEET 1.
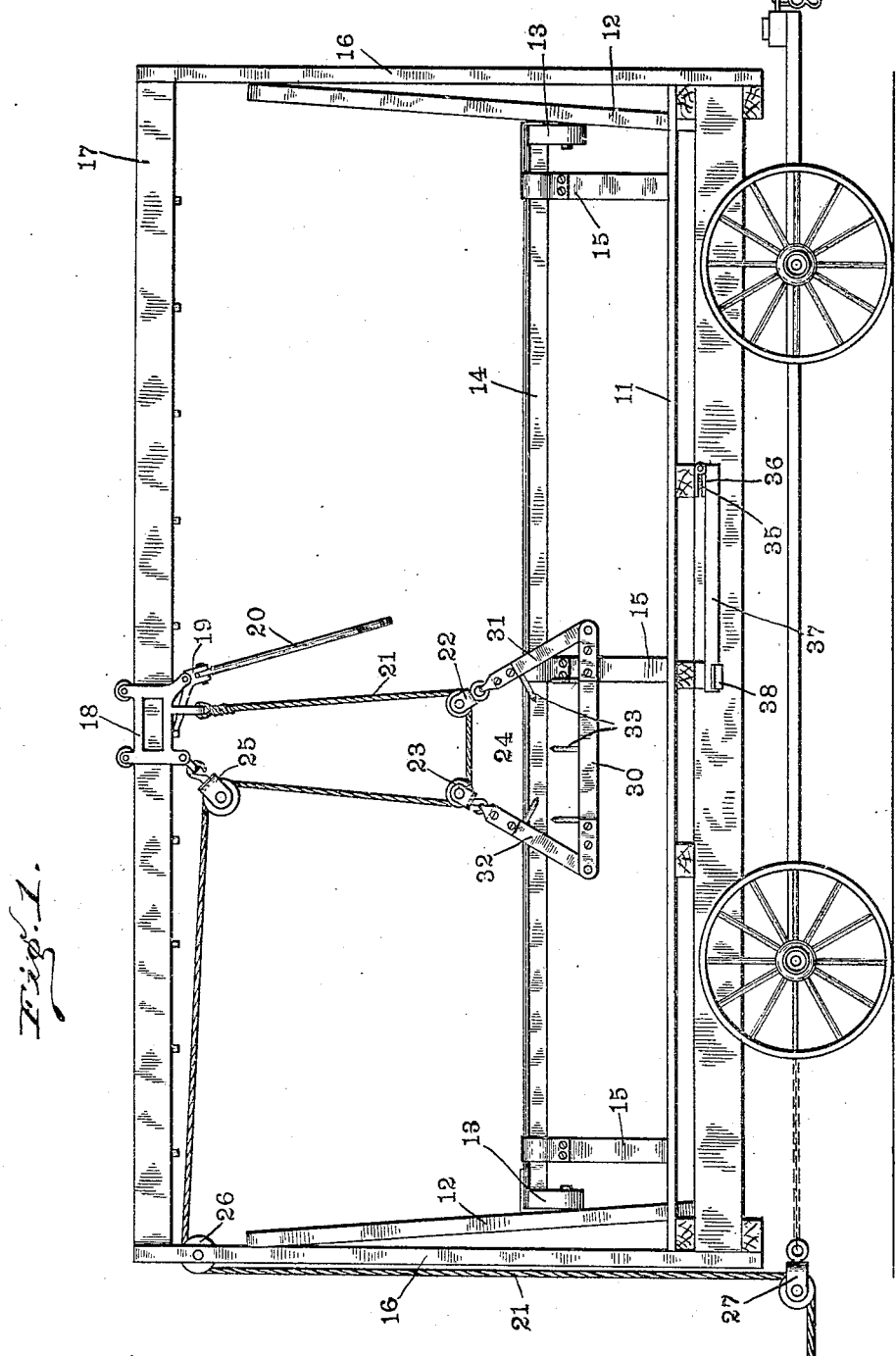
Witnesses
Frank A. Fahle
J. A. Walsh
Inventor
James B. Schuman
By Bradford Hood
Attorneys

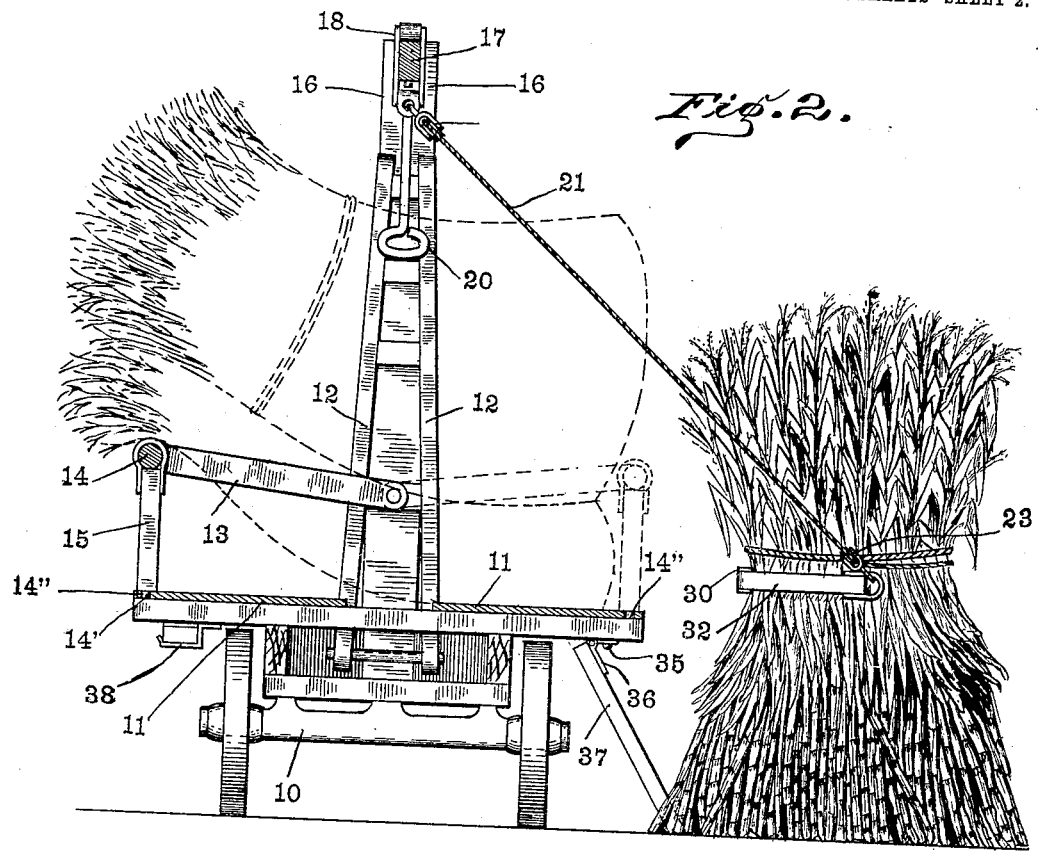

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

SHOCK-LOADER.

948,380.  Specification of Letters Patent.  Patented Feb. 8, 1910.

Application filed April 20, 1905. Serial No. 256,641.

*To all whom it may concern:*

Be it known that I, JAMES B. SCHUMAN, a citizen of the United States, residing at Indianapolis, in the county of Marion and State of Indiana, have invented certain new and useful Improvements in Shock-Loaders, of which the following is a specification.

In harvesting corn and other similar stalk crops, it is customary to form shocks of the crop in the field, and permit the shocks to remain standing through the fall in order to properly cure. The shocks are then usually dissected in the field and loaded upon racks to be carried to a distant point and treated by the shredder. When the shocks have weathered for a considerable period, the stalks are very dry and brittle, and, consequently, a very material portion of the fodder is broken off and left in the field, and thus lost.

The object of my present invention is to produce a portable rack upon which the shocks may be lifted bodily and laid down thereon in such a way as to be easily handled at the shredder.

The accompanying drawings illustrate my invention:

Figure 1 is a side elevation of a rack embodying my invention; and Fig. 2 a central transverse section.

In the drawings, 10 indicates a suitable running gear provided with a platform 11, and the usual booming-ladders 12. Pivoted to each of the ladders 12 is an arm 13, and the outer ends of these arms are connected by a longitudinal bar 14. Pivotally mounted upon the bar 14 are several standards 15 which are distributed at various points in the length of the bar, and each is provided at its free lower end with a pin 14' adapted to enter the socket 14'' formed in platform 11, the sockets 14'' being formed along each side of the platform so that by swinging the arms 13 upon their pivots the bar 14 may be brought to either side of the platform 11. Erected from each end of the platform 11 is a standard 16, the upper ends of which are rigidly connected by means of a longitudinal track beam 17 upon which is mounted a carrier 18, said carrier being adjusted along the track beam and held at any desired point by means of a pawl 19 which may be operated by means of a swinging hand link 20. The carrier 18 is adapted to form a support for any desirable form of lifting mechanism. This lifting mechanism consists of a cable 21, one end of which is attached to the carrier 18 while the other end is passed through pulley blocks 22 and 23 carried by the shock grapple 24, and pulley blocks 25, 26 and 27. The grapple 24 consists of a central bar 30 to the ends of which are pivoted end bars 31 and 32. Each of these bars is provided on its inner edge with inwardly projecting teeth 33 adapted to enter the shock transversely. Pulley block 22 is carried by the free end of bar 31 and pulley block 23 is detachably connected to the free end of bar 32.

In order to prevent the platform from tipping when the shocks are lifted, I pivot to the under side of the platform 11 at each side, on a vertical pivot 35, one leaf of a hinge 36, the other leaf of which is attached to a prop member 37, the arrangement being such that the prop on the near side of the platform may be dropped into the position shown in Fig. 2, and thus serve as a strut for this side of the platform. When not in use the prop is swung up on the pintle of the hinge and then swung around on the pivot 35 so that its free end may be supported in a suitable clip 38.

In operation, the grapple 24 is placed on a shock, as shown in Fig. 2, the bar 30 thereof being next the carriage, and the rope 21 encircling the shock at its far side. When a pull is exerted on the rope 21 under these conditions, the shock is first compressed and then tilted with its top end toward the carriage so that it may be laid with its butt end on the platform, and its top supported by the bar 14. About three shocks (the number varying with the length of the wagon) will be laid on the frame and their bands cut so that the stalks may be spread out in a uniform layer over the structure. In doing this, the stalks will remain substantially parallel and will not become tangled as they would when placed in position on a rack in successive arm loads. Several more shocks are then lifted to position on top of the layer of loose stalks already placed, and these shocks are preferably lassoed so as to be held in shock-form during transportation to the shredder. When the shredder is reached, the lassos of the last loaded shocks are removed and the bands of these shocks cut and the stalks fed to the shredder. Under these conditions the stalks when they reach the shredder are laid straight across the frame and are not at all tangled together, so that they may be readily removed and fed.

Two or more of the devices just described will be used in connection with a single shredder and when a driver goes to the field he will know to which side of the shredder he will return and he will, therefore, swing the bar 14 to that side of the frame which will permit him to load with the butt ends of the stalks adjacent the side of the frame which is to be driven adjacent the shredder.

The carrier apparatus illustrated herein forms the subject-matter of my pending application No. 256,081 filed April 17, 1905.

I claim as my invention:

1. A shock loader consisting of, a portable platform, a shock-supporting bar connected to the platform by means permitting its movement from one side to the other thereof, and means for supporting said bar parallel with the platform above either side of the platform.

2. A shock loader consisting of, a portable platform, means for lifting shocks bodily to said platform, a longitudinal shock supporting bar, a pair of arms pivoted to said bar and to the portable platform whereby the longitudinal bar may be swung to either side of the platform, and means for supporting said bar above either edge of the platform.

3. A shock loader consisting of, a portable platform, a longitudinal shock supporting bar, a pair of arms pivoted to said bar and to the portable platform whereby the longitudinal bar may be swung to either side of the platform, and means for supporting said bar above either edge of the platform.

4. A shock loader consisting of, a portable platform, a longitudinal stalk supporting bar, a pair of arms pivoted to the platform and carrying said bar, and supporting legs carried by said bar, the arrangement being such that the stalk supporting bar may be swung to either side of the platform and supported above the same by said legs.

5. A shock loader consisting of, a portable platform, a longitudinal stalk supporting bar, a pair of arms pivoted to the platform and carrying said bar, supporting legs carried by said bar, the arrangement being such that the stalk supporting bar may be swung to either side of the platform and supported above the same by said legs, and means for lifting the shocks bodily to said platform.

In witness whereof, I have hereunto set my hand and seal at Indianapolis, Indiana, this 12th day of April, A. D. one thousand nine hundred and five.

JAMES B. SCHUMAN. [L. S.]

Witnesses:
ARTHUR M. HOOD,
JAMES A. WALSH.